United States Patent [19]
Schaefer

[11] Patent Number: 5,810,142
[45] Date of Patent: Sep. 22, 1998

[54] FLOW CONTROL VALVE FOR ROTATING COMPONENT

[75] Inventor: Helmut Schaefer, Ketsch, Germany

[73] Assignee: Deere & Company, Moline, Ill.

[21] Appl. No.: 728,812

[22] Filed: Oct. 10, 1996

[30] Foreign Application Priority Data

Oct. 27, 1995 [DE] Germany .................. 195 39 968.4

[51] Int. Cl.⁶ .................. F16D 13/72; F16K 1/38; F16K 21/00
[52] U.S. Cl. .................. 192/70.12; 137/517; 192/91 R; 192/113.35
[58] Field of Search .................. 192/70.12, 113.35, 192/113.34, 91 R, 85 AA, 106 R; 137/517, 540, 541, 493.7, 493.2

[56] References Cited

U.S. PATENT DOCUMENTS

| | | | |
|---|---|---|---|
| 1,443,675 | 1/1923 | Bowler . | |
| 2,353,161 | 7/1944 | Heigis . | |
| 2,583,919 | 1/1952 | Wilson | 192/85 AA |
| 2,869,701 | 1/1959 | Yokel | 192/85 AA |
| 2,908,282 | 10/1959 | Maisch | 137/199 |
| 3,016,121 | 1/1962 | Mosbacher | 192/91 A |
| 3,370,682 | 2/1968 | McFarland | 192/85 AA |
| 3,602,347 | 8/1971 | Yamaguchi et al. | 192/106 F |
| 3,719,322 | 3/1973 | Gifford | 236/102 |
| 3,924,717 | 12/1975 | Ookubo et al. | 192/113.35 X |
| 4,502,582 | 3/1985 | Lech et al. | 192/85 AA |
| 4,561,460 | 12/1985 | Smith | 137/493.2 |
| 5,215,113 | 6/1993 | Terry | 137/517 X |
| 5,613,518 | 3/1997 | Rakieski | 137/517 X |

FOREIGN PATENT DOCUMENTS

| | | |
|---|---|---|
| 00 57 599 B1 | 8/1982 | European Pat. Off. . |
| 0 190 822 | 8/1986 | European Pat. Off. . |
| 2 596 830 | 10/1987 | France . |
| 2658541 | 6/1978 | Germany . |
| 3723673 | 1/1989 | Germany . |
| 3736584 | 5/1989 | Germany . |
| 42 28 045 A1 | 1/1993 | Germany . |
| 41 19 874 A1 | 3/1994 | Germany . |

OTHER PUBLICATIONS

Patent Abstracts of Japan vol. 16 No. 262 (M1265), Jun. 15, 1992.

*Primary Examiner*—Rodney H. Bonck

[57] ABSTRACT

A valve for flow control with a flow recess and with a valve seat inside the flow recess is located beyond the axis of rotation of a rotating component and extends parallel to the axis of rotation. Inside the flow recess there is a movable valve body which interacts with the valve seat. A return spring takes effect on the valve body and the valve body is pressed in a closed position in the valve seat by the flow medium.

16 Claims, 2 Drawing Sheets

FLOW CONTROL VALVE FOR ROTATING COMPONENT

FIELD OF THE INVENTION

The present invention relates to valves for flow control, and more particularly to an improved valve for flow control within a flow opening located in a rotating component, away from the axis of rotation.

More specifically, the invention relates to a flow control valve suitable for use in a multi-disk clutch that can be actuated by pressurized fluid.

BACKGROUND OF THE INVENTION

In agricultural and industrial vehicles such as tractors and the like, multi-disk clutches, that are spring-loaded and actuated by pressurized fluid, are used for the engagement and disengagement of the front wheel drive. In order to make possible consistent lubrication of the individual clutch disks, in particular when the clutch is engaged, these clutches contain valves. The valves seal the interior of the clutch, as long as a pressure exists in the clutch through which the clutch disks are separated from one another. When no pressure exists, the valves open the interior to the surrounding environment in order to assure a flow of lubricant and to make possible an adequate cooling of the clutch disks.

DE-A-41 19 874 discloses a multi-disk clutch that is engaged by spring force and is disengaged by the pressure of a pressurized fluid. The space enclosing the clutch disks is configured as a generally sealed chamber that is connected to a source of pressure in order to disengage the clutch. A valve is arranged in the outer surrounding region of the rotating clutch drum, which is closed when the chamber is pressurized with the clutch disengaged, and connects the unpressurized chamber to a reservoir when the clutch is engaged, in order to assure a flow of lubricant and cooling to the clutch disks. The valve contains a valve component that can slide in a radial valve channel. The valve component is exposed on the one hand to chamber pressure that forces it radially outward, in order to seal off a transverse channel connected to the chamber, and, on the other hand is loaded by a spring force which forces the valve component radially inward in order to open the transverse channel to a reservoir. Due to the radial orientation of the valve channel the valve body is exposed to the effect of centrifugal force, so that valve closing conditions depend on the speed of rotation of the clutch drum, which may be undesirable.

EP-B-0 057 599 reveals a different clutch type in which a rotating housing encloses a clutch disk package and a piston. By raising the pressure in a piston chamber the piston is moved and compresses the clutch disk package. A pressure relief valve that is oriented axially is located in the housing and connects the piston chamber with an external reservoir. The relief valve is a ball valve in which a conical valve seat, that is arranged in a guide penetration parallel to the axis of rotation through the wall of the housing, interacts with a ball. The ball is forced against the valve seat, on the one hand, by the force of a spring and, on the other hand, by the pressure in the piston chamber, in order to close the relief valve. The diameter of the guide penetration is larger than that of the ball, so that when the housing is rotating the ball can move radially outward under the centrifugal force and can be lifted off the seat. When the pressure in the piston chamber falls due to a clutch disengagement process at rotational speeds that exceed a pre-set limit, the relief valve opens on the basis of centrifugal forces which force the ball radially outward and lift it off the valve seat. Thereby a rapid release of the clutch disks should be made possible upon disengagement of the clutch at high rotational speeds. This relief valve cannot be used, however, where a flow control is required independent of centrifugal force. Furthermore, if steel balls are used, the inertia forces on the ball caused by the rotational speed may be so high, that, when the pressure is applied to the piston chamber, the ball can no longer return to the valve seat under the impulse of the forces of the fluid flow, and therefore the valve does not close.

SUMMARY OF THE INVENTION

It is therefore an object of the present invention to define a flow control valve for a rotating component which performs its assigned operation reliably, independent of inertia forces, conforms to the requirements for sealing at the seat even at high pressures and temperatures, is easy to manufacture at low cost and is simple to install.

According to the invention the object is attained with a valve having a spring means oppose the pressure of the medium in order to lift the valve body from the valve seat. The valve body is supported radially on the wall of the flow opening and the valve body and/or the flow opening is provided with at least one flow channel that extends between the valve seat and the side of the valve body opposite the valve seat.

The valve according to the invention is largely freed from inertia forces, since the valve body is supported on the wall of the flow opening so that the radial centrifugal forces are absorbed. The centrifugal force can only be noticed in the friction forces between the valve body and the wall. Independent of the rotational speed of the rotating component, which is seen as the clutch drum of a clutch, the valve body is closed by the pressure forces of the medium flowing through the valve and is opened by the spring force of the spring means.

In order to assure proper operation of the valve it is useful to guide the valve body within the flow opening so that it can slide in the axial direction parallel to the axis of rotation.

The manufacture of the flow opening is particularly simple if the flow opening is machined as a bore and the valve is provided with guide means that support it on the cylindrical wall of the bore.

Preferably the seat is not configured with a sealing line, but as a sealing surface, where the valve body and the valve seat arranged in the flow opening are provided with corresponding conical surfaces. The use of corresponding conical sealing surfaces results in an appropriate sealing performance. The valve seat in the flow opening can easily be machined at a step between two sections of the bore that are aligned with each other and have differing cross sections by the use of a countersink tool.

In order to limit the movement of the valve body within the bore, a retaining ring or snap ring is used as a stop in the path of the sliding motion of the valve body.

It is advantageous to manufacture the valve body from a material of low density, preferably a plastic, so that the valve body is subject only to a small amount of centrifugal force. The valve body can be manufactured very easily and at low cost as a plastic molding with close tolerances, for example, as an injection molded part. The plastic insures a seat with good sealing since the valve body can conform plastically to the valve seat during the closing of the valve. With the proposed valve body any deformation poses no problem, in contrast to a plastic ball, since the same regions of the valve body always come into contact with the valve seat. In the case of a ball the notches created by the deformation have a deleterious effect on the sealing performance when the ball is repositioned or is rotated.

In material selection it is advantageous to choose a plastic with the same coefficient of thermal expansion as the clutch drum. As a result, temperature changes in the clutch drum due to changes during operation do not change the tolerances between the valve body and the flow opening in the clutch drum.

With a clutch drum of steel a selection of the valve body material as polyacrylamide is advantageous, since this plastic exhibits the properties noted above and can be used in oil.

A function of the valve is to make possible the flow of lubricating oil through the clutch drum and through channels in the disk package when the clutch is engaged. Therefore, at least one flow channel for the lubricating oil is provided on the valve body, that can be cut into the cylindrical outer surface of the valve body. In order to permit proper sealing, the flow channel ends outside of the sealing surface. The circumferential surface of the valve body may consist of individual ribs extending in longitudinal direction, through which the valve body is supported on the wall of the bore.

The least possible blockage of the flowing medium and consequent low fluid flow losses can be attained if the total cross sectional area of the flow channels is at least as large as the cross sectional area between the valve seat and the valve body when the valve is in the open position.

Providing the flow channel with an inclined ramp that rises in the direction of flow or if the floor of the flow channel rises continually, preferably in a parabolic shape, improves the flow characteristics of the flowing medium since the ramp provides for improved entry of the flow. The entry region is enlarged to compensate for partial blockage by the snap ring.

In order to free the return spring of the valve also from the effect of centrifugal force, it is guided axially on the side of the valve body that faces the valve seat, and at its opposite end is guided in a region of the flow opening with a reduced diameter. Particular advantage results when a cylindrical end of the spring is guided in a concentric cylindrical recess in the valve body.

An advantageous application for the valve according to the invention is found in a multi-disk clutch actuated by a pressurized fluid. The valve seals the interior of the clutch drum when pressure is applied to it. When no pressure is applied, however, a flow of lubricant is guaranteed. The valve according to the invention functions at any desirable rotational speed of the clutch drum, since it opens under spring force when no fluid pressure is applied and is closed by the force of the flowing medium when the clutch pressure is applied.

The valve according to the invention can also be employed as an in-flow control valve, that makes possible a flow of the pressurizing medium from a reservoir into the clutch interior when the clutch is engaged. When the clutch is engaged and therefore no pressure is applied to the interior a small negative pressure develops in the interior, since the lubricant can be thrown outward through the valves, according to the invention, that are located radially outward. In this case the valves located radially inward open by spring force and permit a flow of lubricant which flows past the clutch disks in their engaged position in order to cool them.

Further advantageous embodiments are given by the subordinate claims.

In the following the invention is explained in greater detail on the basis of embodiments with reference to the drawing.

DETAILED DESCRIPTION OF THE PREFERRED EMBODIMENTS

Figure 1:
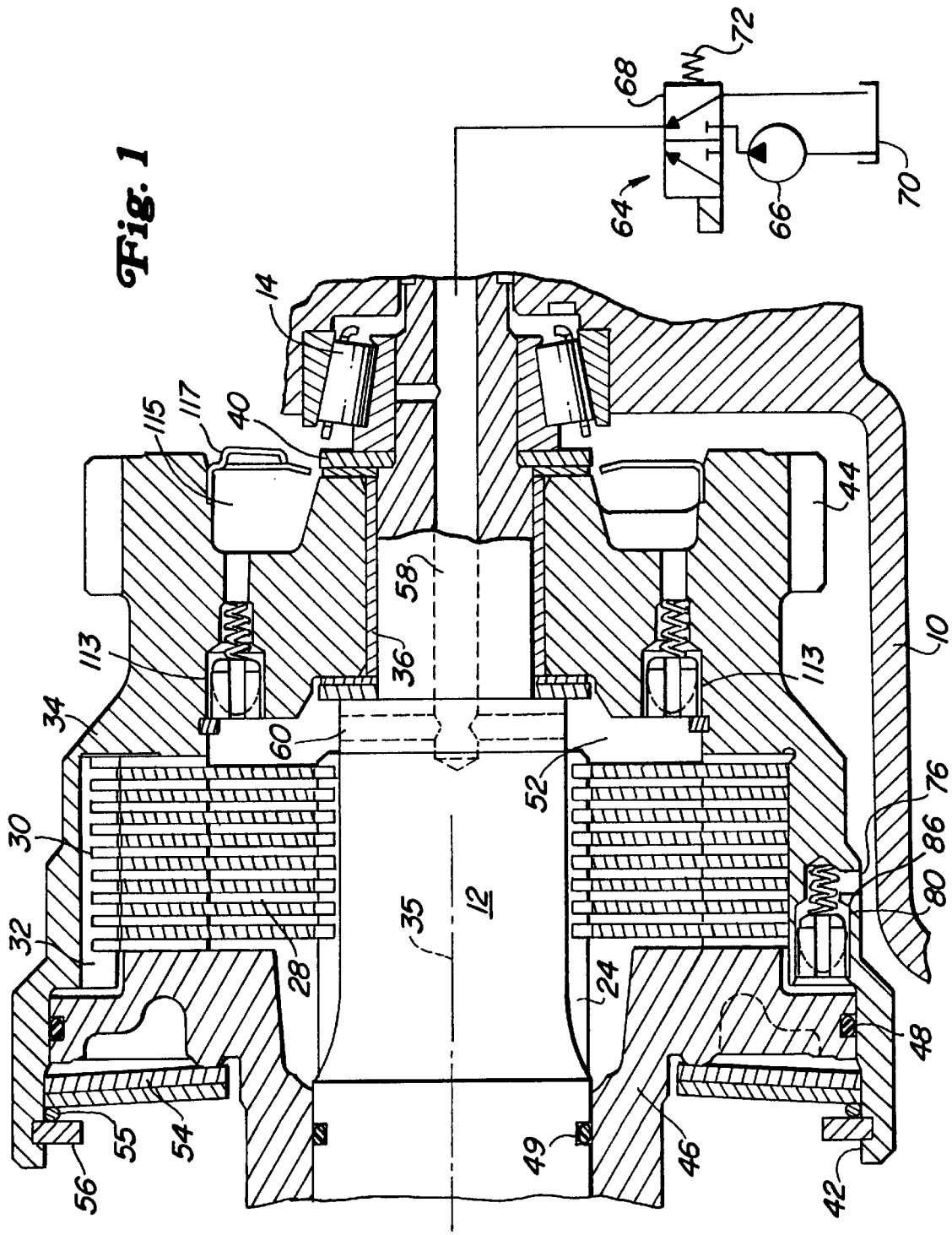
FIG. 1 shows a section through a multi-disk clutch with valves according to the invention.

According to FIG. 1 a clutch housing 10 is supported on a shaft 12 by two tapered roller bearings 14, of which only one is shown. Cooling or lubricating oil collects in the clutch housing 10, which operates as a reservoir.

In its central region the shaft 12 has a set of gear teeth 24 which meshes with the inner disks 26 of a clutch disk package 28. Outer disks 30 of the clutch disk package 28 mesh with a set of gear teeth 32 in the clutch drum 34.

The clutch drum 34 operates as a housing for the clutch disk package 28 and is supported on the shaft 12 through a journal bushing 36 for rotation about an axis of rotation 35 and is secured against axial forces by thrust washers 40. A drive gear 44 is molded in place as part of the clutch drum 34 and meshes with an output gear of a vehicle gearbox, not shown.

A piston 46 is arranged in a cylindrical recess of the clutch drum 34 for axial movement. The piston 46 is sealed by an O-ring 48 against the clutch drum 34 and by a further O-ring 49 against the shaft 12.

The clutch drum 34, the shaft 12 and the piston 46 enclose a generally sealed chamber 52 in which the clutch disk package 28 is located. The clutch disk package 28 is in contact on its one side with a ring-shaped projection of the clutch drum 34 and on its other side with a ring-shaped projection of the piston 46. Separate pressure plates are not provided.

Two Belleville springs 54 are positioned in the region of the recess 42 of the clutch drum 34 that lies outside the piston 46. A retaining ring 56 and a ring 55, engage the outer region of the outer spring 54. The inner region of the inner spring 54 is pre-loaded against the outer surface of the piston 46, so that the piston 46 is biased toward the clutch disk package 28 and compresses the latter. When the clutch disk package 28 is compressed the clutch is engaged and transmits torque from the drive gear 44 through the clutch drum 34 to the shaft 12. The pre-load of the Belleville springs 54 is selected in such a way that a predetermined torque is transmitted without the clutch disks 26, 30 sliding against one another under normal operating loads.

The shaft 12 is provided with an axial bore 58 as well as radial supply bores 60. The supply bores 60, of which only two are shown, connect the axial bore 58 with the chamber 52. The axial bore 58 is connected to a hydraulic supply system 64. The latter consists generally of a hydraulic pump 66, a pressure control valve 68 and a reservoir 70. The pump 66 delivers the system pressure of, for example, 12 Bar. The pressure control valve 68 is an electromagnetic 3/2 way valve with three outputs and two positions, which is moved by an electric control signal against the force of a spring 72 from its first position as illustrated.

In a first position of the pressure control valve 68, as shown, the chamber 52 is connected with the reservoir 70, so that the pressure in the chamber 52 is released and the clutch is engaged.

In a second position the pressure control valve 68 connects the output of the hydraulic pump 66 with the chamber 52. The pressure in the chamber 52 increases to the system pressure with the result that the piston 46 moves outward against the force of the Belleville spring 54, so that the individual clutch disks 26, 30 are separated from one another and can be rotated with respect to each other. In this second valve position, therefore, the clutch is disengaged and does not transmit any torque.

In the clutch drum 34 a radial channel 76 is provided that is open to the circumferential surface of the clutch drum 34 and is connected to a flow opening 80 which is arranged generally parallel to the shaft axis 35 and is open to the chamber 52. In the flow opening 80 a valve body 82 is arranged that is loaded by a return spring 84. A valve 86, described in greater detail below, is opened by the return spring 84, as long as the chamber 52 is not pressurized and the clutch is engaged. The open position of the valve 86 makes possible a flow of lubricant.

Therefore, a flow of coolant is maintained when the clutch is engaged, which protects the clutch disks 26, 30 from overheating in the case that the clutch disks 26, 30 slide with respect to each other due to an overload.

To disengage the clutch, the electromagnetic coil of the flow valve 68 is energized so that the latter moves to its second position and connects the system pressure of the hydraulic pump 66 to the chamber 52. Simultaneously the valve body 82 is moved axially by the pressure against the force of the return spring 84 and closes the connection to the channel 76, so that a pressure drop in the chamber 52 is avoided. When the clutch is disengaged there is no coolant flow, since cooling of the clutch disk package 28 is not required.

If the clutch is to be engaged again, the current flow to the electromagnetic coil of the pressure control valve 68 is interrupted, so that the pressure control valve 68 returns again to its first position. As a result, the chamber 52 is connected to the reservoir 70 and its pressure is released. Accordingly, the valve body 82 returns to its original position as shown under the force of the spring 84 and opens the connection to the channel 76.

Figure 2:
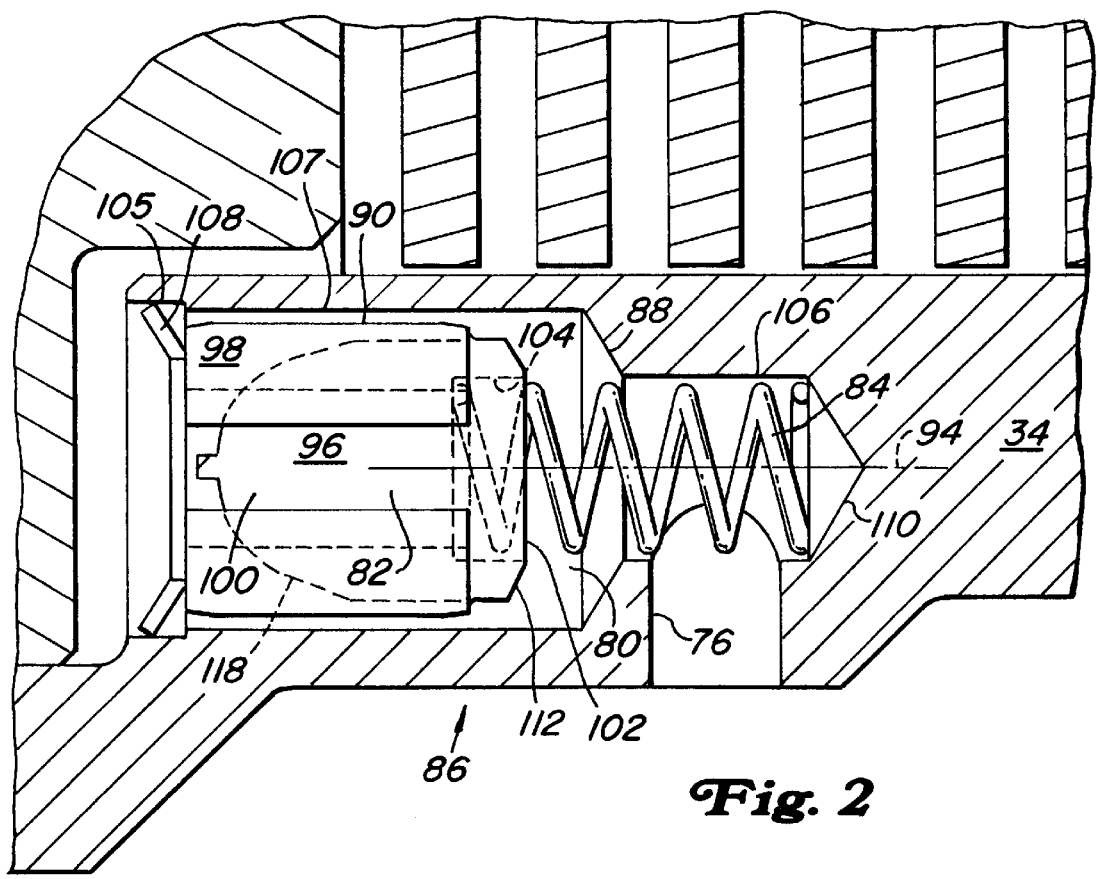
FIG. 2 shows an enlarged partial region of FIG. 1 with a valve according to the invention.

FIG. 2 shows a preferred variation of the embodiment of the valve 86, previously discussed, which makes possible a lubricant flow that cools the clutch disk package 28 when the clutch is engaged and pressure is released. The valve 86 includes a valve body 82 which is arranged for axial movement in a cylindrical flow opening 80 that extends parallel to the axis of rotation 35 and is located outside the axis of rotation 35 of the clutch drum 34. The valve body 82 interacts with a valve seat 88 in the flow opening 80 and is forced away from the valve seat 88 by a return spring 84.

The flow opening 80 is a stepped bore with three cylindrical sections 105, 106, 107 that is open to the chamber 52. The section 106, provided with the smallest diameter and penetrating deepest into the clutch drum 34, is connected through the radial channel 76 with the exterior of the clutch drum 34 and thereby with the clutch housing 10 that is used as reservoir. This section 106 engages one end of a helical return spring 84 which is supported axially on the run-out of the stepped bore and radially on the side walls of the section 106. The valve body 82 is axially movable in the central section 107 of the stepped bore, which exhibits an intermediate diameter. In the end face of the valve body 82 a locating bore 104 is provided that is cylindrical at least in some regions, which engages the other end of the return spring 84 and supports it radially and axially. A retaining ring 108 is located in the outer section 105 of the stepped bore and is fixed in space. The retaining ring 108 limits the axial movement of the valve body 82.

Between the deepest section 106 and the intermediate section 107 of the stepped bore a conical surface is provided, that can be manufactured easily with a countersink tool. This conical surface forms the valve seat 88, to which the valve 86 applies a corresponding conical sealing surface 112 of the valve body 82 when it is closed.

The outer contour 90 of the valve body 82 is generally cylindrical. The region facing the valve seat 88 is stepped and has a somewhat smaller diameter than the remaining outer contour 90. Towards the end face a conical sealing surface 112 is provided, which corresponds to the conical surface of the valve seat 88. Between the sealing surface 112 and the end face opposite the valve seat 88 several axial flow channels 96 are recessed into the cylindrical outer contour 90 of the valve body 82. The flow channels 96 end radially outside the sealing surface 112 and permit a flow of lubricant only when the valve is open. Adjoining flow channels 96 are separated by ribs 98. The valve body 82 is guided and supported radially in the intermediate section 107 of the stepped bore by the cylindrical outer contour 90 of the ribs 98.

The valve body 82 consists of a plastic of low weight, which preferably has the same coefficient of thermal expansion as the material of the clutch drum 34 (for example, steel). Use of polyacrylamide as the material for the valve body 82 may be advantageous because polyacrylamide has approximately the same coefficient of thermal expansion as steel, meets the strength requirements noted above, has thermal stability in lubricating oil and can be manufactured at low cost by injection molding.

The operation of the valve 86 is as follows:

If only a low pressure exists in the chamber 52, then the valve body 82 is moved to the left as seen in FIG. 2 by the force of the return spring 84 until it makes contact with the retaining ring 108. In this position lubricant can flow out of the chamber 52 through the flow channels 96, the space between the valve seat 88 and the sealing surface 112 of the valve body 82 and through the flow channel 76 into the reservoir. As the pressure in the chamber 52 increases, on the one hand, the pressure force on the end face of the valve body 82 facing the retaining ring 108 increases, and on the other hand, the speed of the flow through the valve 86 is increased. The increasing speed of flow leads to an increase in the friction forces on the side surfaces of the flow channels 96 of the valve body 82. Increasing pressure forces and friction forces finally lead to the valve body 82 moving axially against the force of the return spring 84 until the sealing surface 112 is forced against the valve seat 88 so that the valve closes and the flow of coolant is interrupted. Now the pressure in the chamber 52 can build up without hindrance, whereupon the piston 46 is moved and the clutch disks 26, 30 separate from one another.

FIG. 1 shows two further inflow control valves 113 that are arranged in openings in the clutch drum 34 located further inward radially, and control the inflow between the reservoir and the chamber 52. The inflow control valves 113 have the same configuration as the valve 86 shown in the outer region of the clutch drum 34 and is shown in greater detail in FIG. 2. When the clutch is engaged and hence there is no pressure in the interior of the chamber 52 a small negative pressure develops in the latter since the lubricant and coolant can be expelled through the valves 86, according to the invention, that are located radially outward. The inflow control valves 113, according to the invention, that are located radially inward then open under the force of their return springs 84 and make possible a flow of lubricant that flows past the clutch disks 26, 30 which are engaged and thus are cooled.

In the clutch drum 34 an annular space 115 is located axially ahead of the inflow control valves 113. In the annular space 115 a turbine wheel 117 is arranged. Lubricant and coolant is conveyed by the turbine wheel 117 from the clutch housing 10, that is configured as a reservoir, into the annular space 115 and drawn from there by the negative pressure into the chamber 52. Thereby the lubricant and coolant is not led through the electromagnetic valve 68, but over the turbine wheel 117 and the inflow valves 113. An interior pressure of 1 to 2 Bar can close the inflow valves 113, and interrupt the lubricant and coolant circulation over the turbine wheel 117, the inner inflow valves 113 and the outer valve 86.

Figure 3:
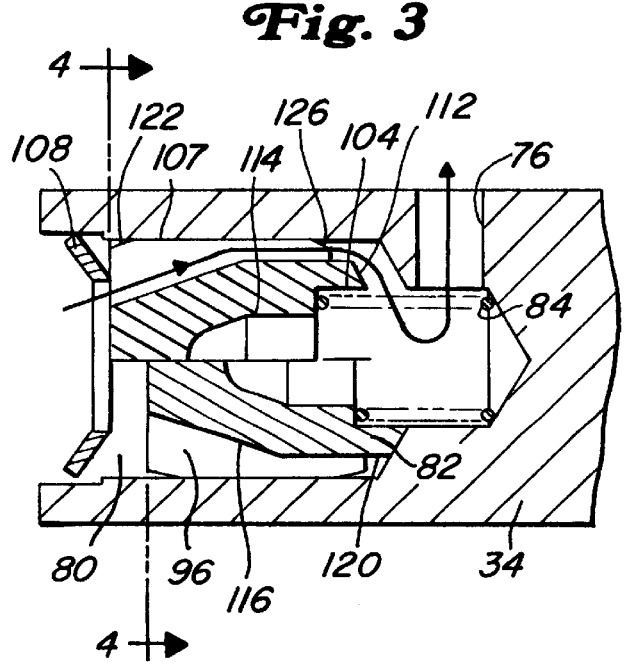
FIG. 3 shows a longitudinal section through a further valve according to the invention in two positions, where the upper part of the illustration shows the valve in the open position and the lower part shows the valve in the closed position.
Figure 4:
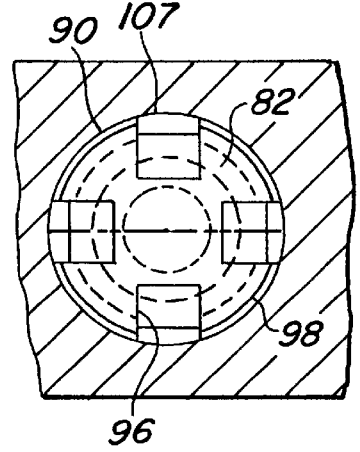
FIG. 4 shows a section through the valve of FIG. 3 along the line 4—4.

A further preferred embodiment of the valve body 82 is disclosed by FIGS. 3 and 4. In the following the same part number call-outs are used for the corresponding components as in FIG. 2.

FIG. 3 shows the valve body 82 in two positions. The valve body 82 shown above the centerline is in its open position, while the valve body 82 shown below the centerline occupies the closed position. The lubricant flow is indicated by an arrow in the upper part of FIG. 3.

The outer contour 90 of the valve body 82 shown in FIGS. 3 and 4 is generally cylindrical. The end face of the valve body 82 that faces the valve seat 88 contains a conical sealing surface 112. An axial cylindrical locating bore 104 is provided in this end face for locating one end of the return spring 84. The locating bore 84 is adjacent to a further bore section 114 with a smaller diameter, that is configured in such a way that the wall thickness of the valve body 82 is approximately constant over its axial extent. In addition the manufacture by injection molding is simplified.

The outer contour 90 of the valve body 82 is provided with four flow channels 96 that extend axially, are arranged symmetrically and are separated by ribs 98 whose cylindrical outer surfaces support the valve body 82 in the flow opening 80. The fewest possible flow channels 96 with large cross sections should be provided, in order to assure an adequate mass flow and to keep the friction losses of the flow small.

The radial depth of the flow channels 96 is not constant in the axial direction in the left half (as seen in FIG. 3) of the valve body 82, but decreases from the side of the retaining ring 108 to the side of the valve seat 88. Therefore the bottom surfaces of the flow channels 96 form an inclined ramp 116. Thereby the entry of the flowing medium into the flow channels 96 is improved where it could otherwise be hampered by the retaining ring 108. In place of the inclined ramps 116 shown in FIG. 3, the bottom surface 118 of the flow channels 96 may also rise in a parabolic shape as is indicated by dashed lines in FIG. 2. The parabolic shape results in a favorable flow characteristic.

In a small section of the valve body 82 facing the valve seat 88 its outer diameter is reduced so that the outer contour coincides with the bottom surfaces of the flow channels 96. This measure improves the flow when the pressure control valve 68 is open.

In their axial end regions the ribs 98 are tapered in a conical shape, to simplify the insertion of the valve body 82 into the flow opening 80.

What is claimed is:

1. A valve for controlling flow of a flowing medium comprising:
   a. a component rotatable about an axis, said component having a flow opening spaced from and extending parallel to the axis of rotation;
   b. a valve seat disposed in the flow opening;
   c. a valve body disposed in the flow opening for movement between an open position spaced from the valve seat and a closed position in engagement with the valve seat, said body biased toward the closed position by the flowing medium;
   d. spring means for opposing pressure caused by the flowing medium, said spring means acting between the valve body and the component for biasing the valve body toward the open position; and
   e. one or more flow channels extending between the valve seat and the side of the valve body opposite the valve seat.

2. The valve of claim 1 wherein the valve body is guided and free to move axially in the flow opening parallel to the axis of rotation.

3. The valve of claim 1 wherein the total cross sectional area of the flow channels is at least as large as the flow area between the valve seat and the valve body when the valve body is in the open position.

4. The valve of claim 1 wherein the flow opening includes a cylindrical section oriented parallel to the axis of rotation and the valve body is guided axially within the cylindrical section.

5. The valve of claim 4 wherein the cylindrical section of the flow opening tapers to form a conical surface constituting the valve seat, and the valve body is provided with a corresponding conical sealing surface.

6. The valve of claim 1 additionally comprising a retaining device intruding into the path of movement of the valve body for limiting movement of the valve body.

7. The valve of claim 1 wherein the spring means is a helical return spring supported in the flow opening, and wherein the valve body has a recess which is cylindrical at least in some section and engages the helical return spring.

8. The valve of claim 1 wherein the valve body consists of a plastic which has approximately the same coefficient of thermal expansion as the rotating component.

9. The valve of claim 1 wherein the valve body comprises:
   a. end faces;
   b. a conical sealing surface at one of the end faces;
   c. a flow channel connecting the end faces, said flow channel extending radially outside the conical sealing surface; and
   d. an outer surface which is cylindrical at least in some sections.

10. The valve of claim 9, wherein the valve body has a channel which constitutes the flow channel and said channel is disposed radially outside the conical sealing surface.

11. The valve of claim 9, wherein the flow channel comprises an inclined ramp which rises in the direction of flow.

12. The valve of claim 9 further comprising axial guidance means for guiding the spring means, said axial guidance means provided in the end face of the valve body at which the sealing surface is located.

13. The valve of claim 12 wherein the spring means has a cylindrical end and the axial guidance means comprises a concentric cylindrical recess in the end face of the valve body at which the sealing surface is located for the location of the cylindrical end of the spring means.

14. The valve body of claim 9 wherein the valve body is made of plastic.

15. The valve of claim 1 wherein the component is a multi-disk clutch for a vehicle having an additional drive axle.

16. The valve of claim 15 wherein the valve is arranged in the radially inner region of the multi-disk clutch for controlling inflow, and the flowing medium is a lubricant.

* * * * *